(12) United States Patent
Badarinarayan et al.

(10) Patent No.: US 7,848,837 B2
(45) Date of Patent: Dec. 7, 2010

(54) METHOD AND APPARATUS FOR MONITORING THE QUALITY OF A MACHINING OPERATION

(75) Inventors: Harsha Badarinarayan, Novi, MI (US);
Frank Hunt, West Bloomfield, MI (US);
Kazutaka Okamoto, Novi, MI (US)

(73) Assignee: Hitachi, Ltd, Tokyo (JP)

( * ) Notice: Subject to any disclaimer, the term of this patent is extended or adjusted under 35 U.S.C. 154(b) by 593 days.

(21) Appl. No.: 11/695,211

(22) Filed: Apr. 2, 2007

(65) Prior Publication Data

US 2008/0243290 A1    Oct. 2, 2008

(51) Int. Cl.
G06F 19/00 (2006.01)
B23K 20/12 (2006.01)
B23K 31/02 (2006.01)

(52) U.S. Cl. ................ 700/110; 228/2.1; 228/112.1; 700/174

(58) Field of Classification Search ............ 700/174, 700/110; 228/2.1, 112.1
See application file for complete search history.

(56) References Cited

U.S. PATENT DOCUMENTS

| | | | | |
|---|---|---|---|---|
| 3,609,285 A * | 9/1971 | Scarpelli et al. | ............ | 219/109 |
| 3,720,993 A * | 3/1973 | Farmer et al. | ............ | 228/102 |
| 3,888,405 A * | 6/1975 | Jones et al. | ............ | 228/2.3 |
| 3,998,093 A * | 12/1976 | Bertolasi | ............ | 73/114.52 |
| 4,348,908 A | 9/1982 | Shoh | | |
| 4,721,947 A | 1/1988 | Brown | | |
| 5,232,242 A * | 8/1993 | Bachrach et al. | ............ | 280/5.5 |
| 6,789,722 B2 | 9/2004 | Murakami | | |
| 7,082,374 B2 * | 7/2006 | Ranta | ............ | 702/60 |
| 2005/0242066 A1 * | 11/2005 | Statnikov | ............ | 219/76.13 |

* cited by examiner

*Primary Examiner*—Albert Decady
*Assistant Examiner*—Sivalingam Sivanesan
(74) *Attorney, Agent, or Firm*—Gifford, Krass, Sprinkle, Anderson & Citkowski, P.C.

(57) ABSTRACT

A method for monitoring the quality of a machining operation, such as a friction stir welding operation, in which a tool is rotatably driven by a motor during the machining operation. The energy consumption of the motor is determined from the initiation and to the completion of the machining operation. That energy consumption is then compared against a predetermined energy threshold. In the event that the energy consumed during the machining operation is less than the predetermined threshold, an error signal is generated.

21 Claims, 4 Drawing Sheets

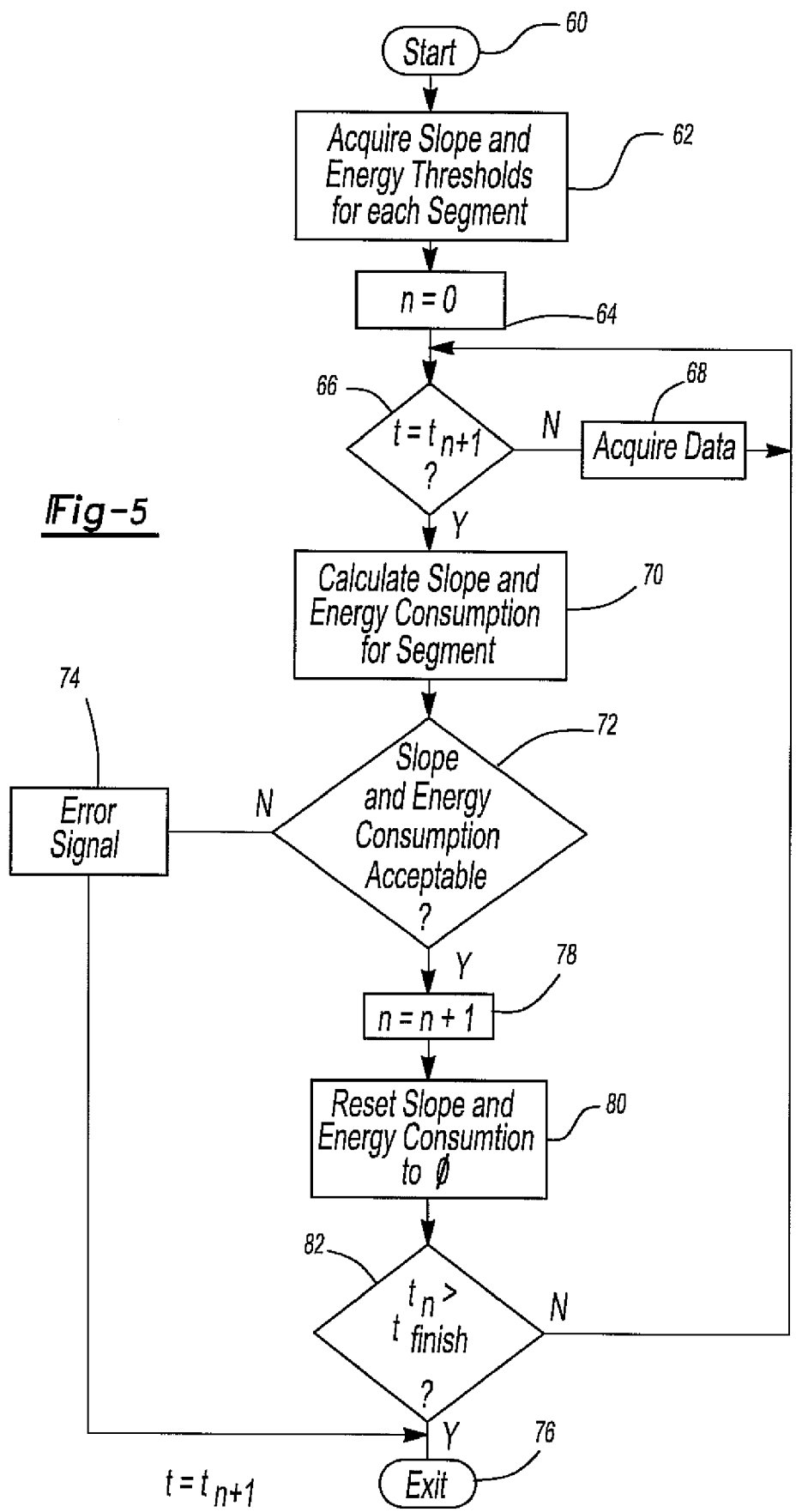

METHOD AND APPARATUS FOR MONITORING THE QUALITY OF A MACHINING OPERATION

BACKGROUND OF THE INVENTION

I. Field of the Invention

The present invention relates generally to a method and apparatus for monitoring the quality of a machining operation, such as a friction stir welding operation.

II. Description of Related Art

There are many different types of machining operations which utilize an electric motor to control the movement of the tool. For example, such machining operations include friction stir welding, milling, drilling, etc.

The proper control of the movement of the machining tool during a machining operation is oftentimes indicative of the quality of the final machined part. For example, during a friction stir welding operation, an insufficient plunge of the pin into the part during the friction stir welding operation will oftentimes result in an inadequate and unacceptable weld.

There have been a number of previously known control strategies employed in the industrial manufacturing industry which monitor various parameters during the machining operation as a form of quality control for that machining operation. For example, some previously known systems have utilized transducers to monitor the condition of the part during the machining operation.

These previously known systems which have utilized such sensors, however, have not proven wholly satisfactory in use. Such sensors can significantly add to the overall cost of the system and may require complex and time-consuming calibration. Furthermore, the performance of such sensors often deteriorates over time and thus results in false readings from the sensors.

A still further disadvantage of these previously known sensors employed to monitor the quality of the machining operation is that the control systems have only monitored the instantaneous values of the sensor outputs in order to ensure that the sensor output falls within a preset range. These sensors, however, are oftentimes subject to industrial environments which contain a great detail of electrical noise. Such noise can influence the output from the sensors and thus result in false readings. Such false readings can indicate that a machined part meets the required quality standards when, in fact, it does not, and vice versa.

SUMMARY OF THE PRESENT INVENTION

The present invention provides both a method and apparatus for monitoring a machining operation, such as a friction stir welding operation, which overcomes the above-mentioned disadvantages of the previously known systems.

In brief, the method of the present invention determines the energy consumption of the motor from the initiation and to the completion of the machining operation. Preferably the time between the initiation and completion of the machining operation is divided into a number of sequential time segments. The power consumption is measured for each segment by monitoring the motor current and motor voltage and determining the power from the product of the voltage and current for each time increment. The energy consumption during the course of the machining operation is then determined by integration of the power calculated for each time segment from the initiation to the completion of the machining operation.

After the energy consumption for the machining operation for each time segment is calculated, the energy consumption is then compared to a preset minimum threshold and, optionally also a preset maximum threshold. If the energy consumption during the machining operation for each time segment falls outside the range set by the minimum and maximum thresholds, an error signal is generated indicative that the machined part falls outside the minimum quality standards.

Optionally, the slope of the power is also calculated for each time segment. The calculated slope is then compared to a preset range of slopes for that particular time segment. In the event that the slope falls outside the threshold range, the error signal is generated indicative that the required quality for the machined part has not been met.

The error signal may be used to alert the operator, terminate the machining process, etc.

In addition, an apparatus for performing the above method is also disclosed.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 5 is a flowchart illustrating the operation of the present invention.

DETAILED DESCRIPTION OF A PREFERRED EMBODIMENT OF THE PRESENT INVENTION

Figure 1:
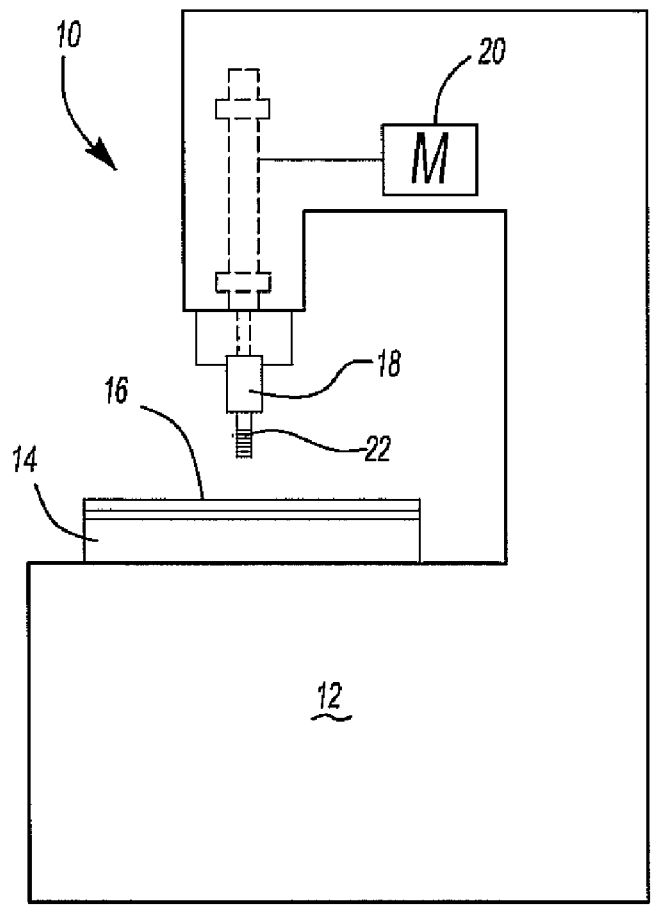
FIG. 1 is a view of a friction stir welding machine.

With reference first to FIG. 1, the present invention will be described for use in conjunction with a friction stir welding machine 10. However, as will become apparent, the method and apparatus of the present invention may be utilized for other types of machining operations which utilize motors in order to drive a machine tool. Consequently, no undue limitation shall be drawn from the description of the preferred embodiment of the present invention as a method for use with a stir welding operation.

Still referring to FIG. 1, the friction stir welding machine 10 includes a frame 12 having a support 14 on which a part 16 to be welded is supported. Typically, the part 16 is rigidly clamped to the support 14 by appropriate clamps (not shown).

A friction stir welding tool 18 is rotatably driven by conventional means, while an electric motor 20 linearly moves the tool 18 toward and away from the part 16. During a friction stir welding operation, while the tool 18 is rotatably driven, the motor 20 linearly plunges the tool 18 toward the workpiece 16 so that a tip 22 for the stir welding tool 18 enters into the workpiece 16. The friction stir welding machine 10 then optionally laterally moves the stir welding tool 18 with its tip plunged into the workpiece 16 along the workpiece 16 in order to form the friction stir weld. Such lateral movement, however, is not required for a spot weld.

Figure 2:
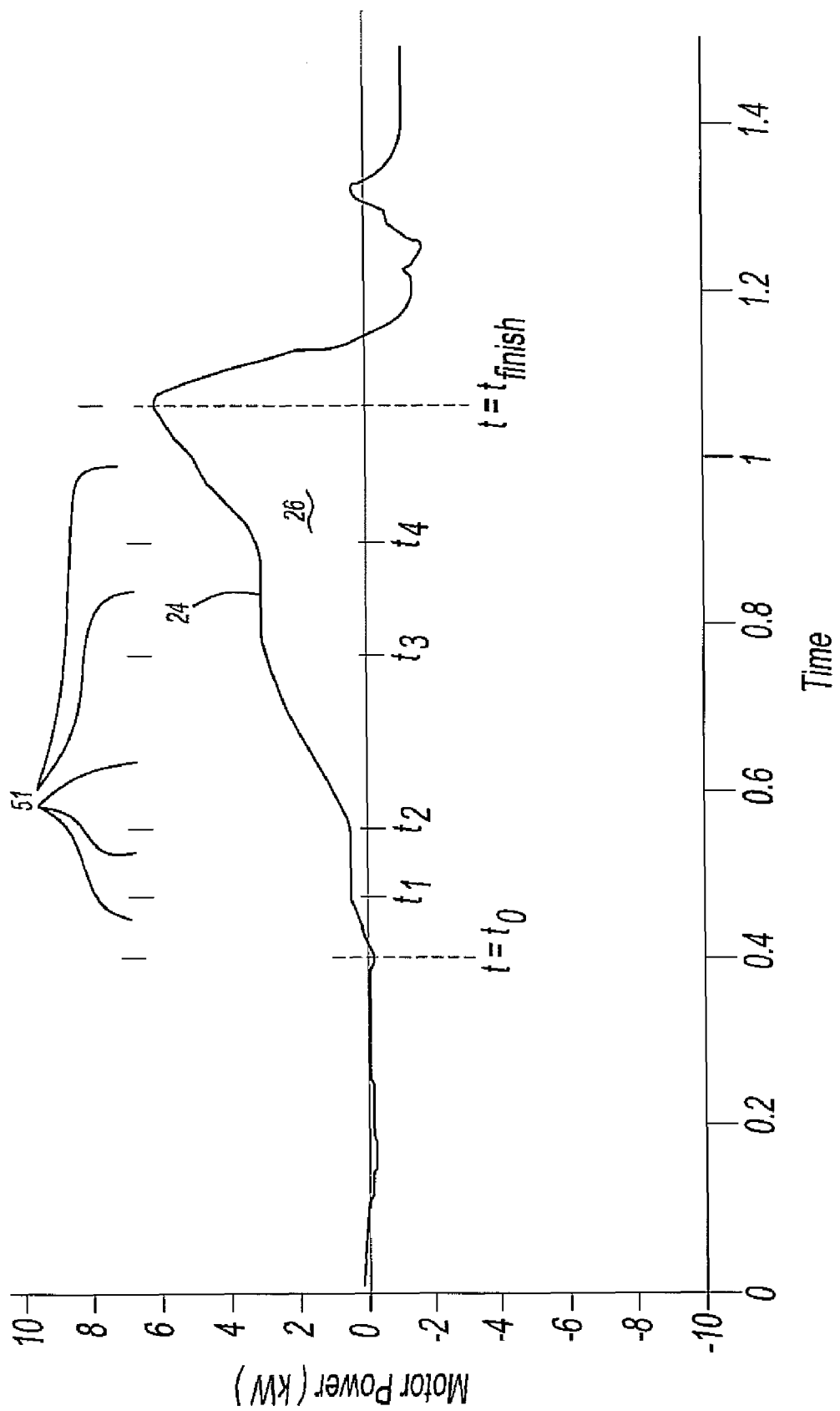
FIG. 2 is a power consumption graph of an exemplary friction stir welding operation.

With reference now to FIG. 2, a graph for the power consumption of the motor 20 during a typical friction stir welding operation is illustrated. For exemplary purposes only, the energy consumption graph 24 is divided into five time segments 51 between the initiation of the machining process at time $t_0$ and the completion of the machining process at time $t_{finish}$. The first time segment extends between time $t_0$ and $t_1$, the second time segment extends between time $t_1$ and $t_2$, and so on. Between time 0 and time $t_0$ the friction stir welding tool 18 is plunged toward the workpiece 16 until the tool tip 22 contacts the workpiece 16 at time $t_0$. Consequently, the power consumption for the motor 20 as it linearly moves the friction stir welding tool 18 toward the workpiece 16 is negligible.

After contact with the workpiece at time $t_0$, the power consumption of the motor 20 increases due to the frictional engagement between the tool 18 and the workpiece 16. This power consumption increases until time $t_{finish}$ at the completion of the welding operation. After time $t_{finish}$, the tool 18 is retracted from the workpiece 16 thus resulting in a rapid decrease of the power consumption by the motor 20.

An area 26 below the graph 24 represents the energy consumption of the motor 20 during the machining operation from time $t_0$ to time $t_{finish}$. Consequently, integration of the graph 24 from time $t_0$ to time $t_{finish}$ produces a value representative of the energy consumption during the machining operation.

In the event of a machining operation of unacceptable quality, the graph 24 for the machining operation will differ from that shown in FIG. 2 which represents the power consumption during a machining operation with acceptable quality. For example, during a friction stir welding operation, an inadequate plunge of the pin, i.e. a plunge to an insufficient depth, will typically consume less power than a pin plunge which produces an acceptable weld. Similarly, an over plunge of the friction stir welding pin into the workpiece 16 will typically result in a power consumption in excess of that illustrated in FIG. 2. Consequently, by integration, i.e. summation, of the graph 24 for the time segments 51 between time $t_0$ and time $t_{finish}$ and comparing that energy consumption against at least a minimum threshold value $TH_{min}$ for each time segment 51 and optionally against a maximum threshold value $TH_{max}$, a determination may be made if the machining operation produced an acceptable quality part. Specifically, if the energy consumption by the motor 20 fell within the threshold $TH_{min}$ and $TH_{max}$, the machined part would have acceptable quality. Otherwise, it would not. The thresholds $TH_{min}$ and $TH_{max}$ may be determined empirically or by modeling.

Still referring to FIG. 2, the slope of the graph 24 between the initiation $t_0$ and completion $t_{finish}$ of the machining operation is also indicative of the quality of the part following completion of the machining operation. Furthermore, the slope of the graph 24 varies from time $t_0$ to time $t_{finish}$ so that examination of the slope of the graph 24 at different time segments 51 of the machining operation is preferred. In addition, a power spike, indicative of electrical noise, is ignored when computing the slope. Such power spikes are short in duration and do not extend over sequential measurement increments and thus may be identified and isolated.

In practice the minimum and maximum thresholds $TH_{min}$ and $TH_{max}$, respectively, are determined either empirically or through modeling and represent the energy consumption during the various time segments 51 to obtain a quality machined part. For example, during a friction stir welding operation, a certain amount of energy is consumed during the pin plunge. An energy consumption less than $TH_{min}$ during the pin plunge may be indicative of an insufficient plunge depth, and thus an unacceptable machined part, since an insufficient plunge depth requires less energy than a pin plunge to full depth, and vice versa.

For example, for a machined part having acceptable quality, the slope of the power consumption graph 24 between time segment $t_0$ and $t_1$ should be within a certain range. Similarly, the slope between time segment $t_1$ and $t_2$ should also be within a certain range, but not necessarily the same range as between time $t_0$ and $t_1$. Likewise, a still different set of acceptable slope ranges between time segments $t_2$ and $t_3$, $t_3$ and $t_4$, and $t_4$ and $t_{finish}$ are all indicative of a machined part having acceptable quality. If the measured slope falls within the acceptable range of slopes for each time segment, the quality is acceptable; otherwise, it is not.

Consequently, by calculating the energy consumption and slope of the power graph for each time segment from time $t_0$ to time $t_{finish}$, and comparing the energy consumption and slope to predetermined and typically empirically determined thresholds, it can be determined whether or not the quality of the machined part is acceptable or unacceptable. If either the energy consumption or the slope of the instantaneous power fall outside the preset thresholds, an error signal is generated indicative that the machined part does not meet acceptable quality standards. The error signal may be used for a variety of purposes, e.g. to alert the machine operator, automatically divert the part to a scrap conveyor, terminate the machining operation, mark the part, etc.

Figure 3:
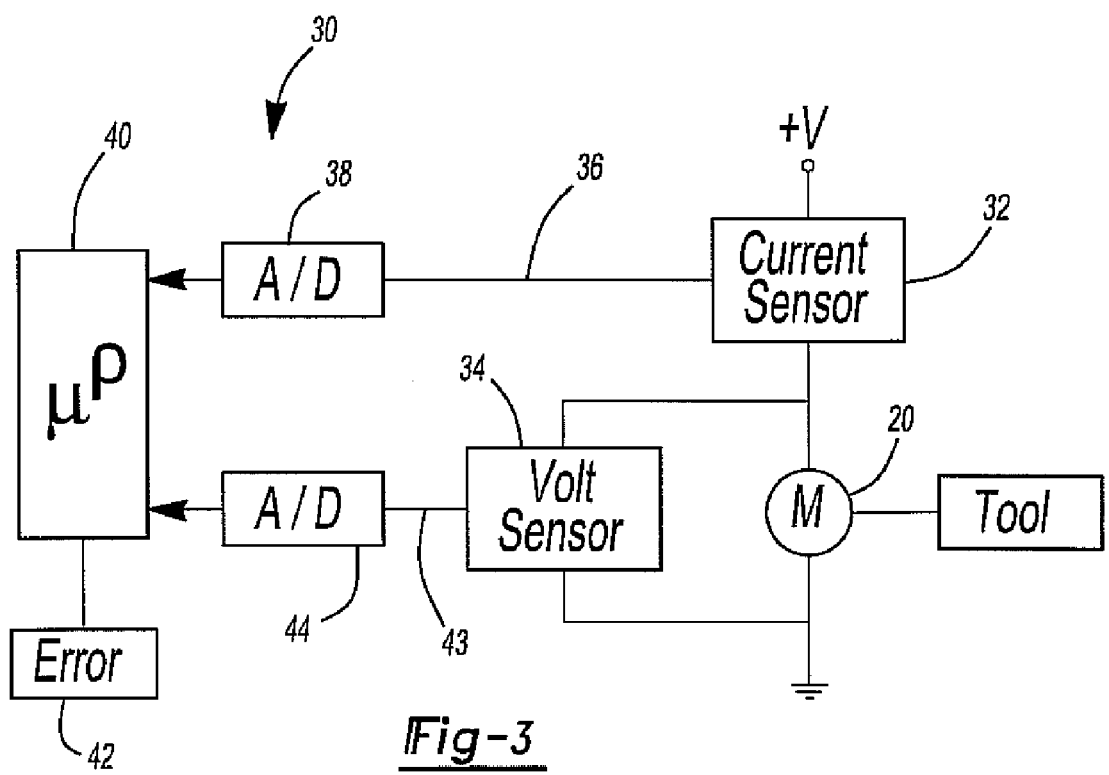
FIG. 3 is a block diagrammatic view of a preferred embodiment of the invention.

With reference then to FIG. 3, a block diagrammatic view of an apparatus 30 for performing the method of the present invention is shown. The apparatus includes a current sensor 32 which measures the instantaneous current of the motor 20. Similarly, a voltage sensor 34 measures the voltage drop across the motor 20.

The instantaneous power consumption of the motor may be determined by the calculation of the current (I) times the voltage (V). Consequently, in order to determine the instantaneous power consumption of the motor 20, an output 36 from the current sensor is coupled through an analog/digital (A/D) converter 38 as an input signal to a preprogrammed processor 40. Similarly, an output 43 from the voltage sensor is coupled through an A/D converter 44 as an input signal to the microprocessor 40. The microprocessor 40, following completion of each time segment of the machining operation from $t_0$ to $t_{finish}$, calculates the energy consumption for the motor 20 by utilizing the outputs 36 and 43 from the current and voltage sensors 32 and 34, respectively. The processor 40 then compares the calculated energy consumption with at least a minimum threshold $T_{min}$ and optionally a maximum threshold $TH_{max}$ for the completed time segment. If the energy consumption falls outside the thresholds, the microprocessor 40 generates an error signal 42 indicative that the quality of the part is unacceptable.

Similarly, the processor 40 calculates the slope of the instantaneous power during each time segment between time $t_0$ and time $t_{finish}$. The processor 40 then compares the slope during each time segment to preset minimum and maximum thresholds but ignores noise spikes. If the slope of the power consumption curve falls outside the acceptable range of slope thresholds for any particular time segment, the microprocessor 40 also generates the error signal 42 indicative of an unacceptable quality part.

Figure 4:
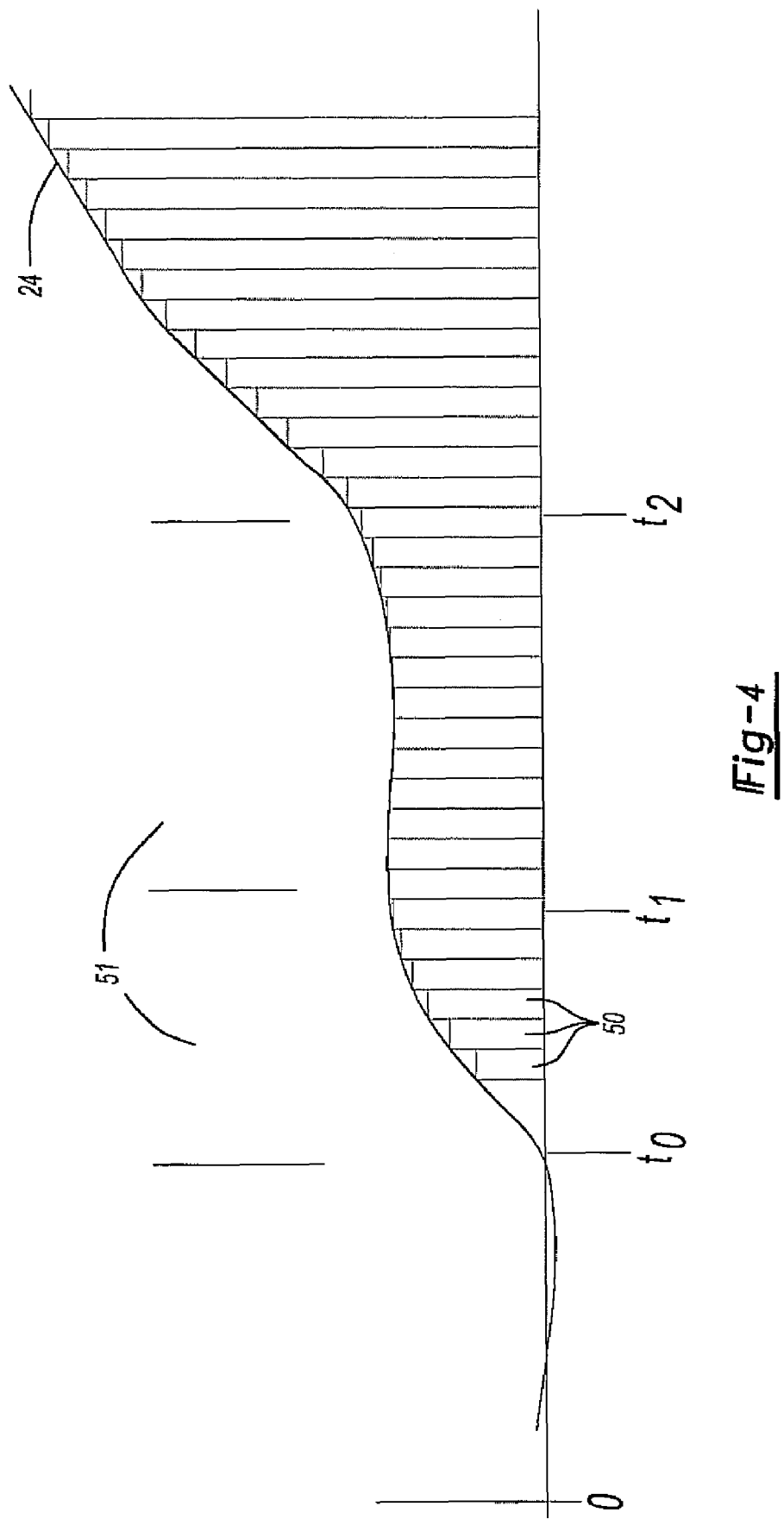
FIG. 4 is a view of a portion of FIG. 2 and enlarged for clarity.

Although any conventional algorithm may be utilized to determine or calculate the energy consumption of the motor 20 between times $t_0$ and $t_{finish}$, as best shown in FIG. 4, the processor 40 preferably mathematically divides the time between time $t_0$ and $t_{finish}$ into a number of very small time increments 50. The energy consumption for each time increment 50 is determined by multiplying the instantaneous current by the instantaneous voltage times the duration of the time increment 50. The processor then sums all of the computed energy consumption for each time increment 50 for each time segment 51 from time $t_0$ to time $t_{finish}$ to find an approximation of the overall total energy consumption of the motor 20 during the machining operation.

Similarly, the slope of the instantaneous power graph 24 may be easily computed by determining the slope of the power graph 24 between adjacent time increments 50.

With reference then to FIG. 5, a flowchart illustrating a preferred embodiment of the invention in which the energy consumption as well as slope during the different time segments 51 is examined to determine the quality of the machined part. The algorithm begins at step 60 and then proceeds to step 62 where the slope and energy thresholds are acquired for each time increment 50 and stored in memory. The slope and energy thresholds, for example, may be acquired from an appropriate database in which the slope and threshold data was previously empirically determined. Step 62 then proceeds to step 64.

Step 64 first initiates the time segment 51 counter n to 0 and proceeds to step 66. At step 66, the algorithm determines whether or not the instantaneous time t is equal to the time $t_{n+1}$, i.e. the end of the particular time segment 51 for the energy consumption curve. If not, step 66 branches to step 68 where the instantaneous power for each time increment 50 (FIG. 4) is acquired as data. Step 68 then proceeds back to step 66 where the above process is iteratively repeated.

Consequently, it can be seen that steps 66 and 68 iteratively input the energy consumption for each of the time increments 50 in the current time segment 51 until the current time reaches the end of its current time segment 51. At that point, step 66 branches to step 70.

At step 70, the processor calculates the slope and energy consumption for the current time segment 51 from the data inputted by steps 66 and 68. Step 70 then proceeds to step 72.

At step 72, the processor compares the calculated energy consumption and slope for the time segment 51 just completed. In the event that the slope and/or energy consumption for that particular time segment 51 falls outside the previously determined upper and lower thresholds, step 72 branches to step 74 and generates an error signal. Step 74 then branches to step 76 at which time the machining process is terminated.

Conversely, if the slope and/or energy consumption for the just completed time segment 51 falls within the acceptable thresholds, step 72 instead branches to step 78 where the counter n for the time segments 51 is incremented. Step 78 then proceeds to step 80 where the slope and energy consumption are reset to 0. Step 80 then proceeds to step 82.

At step 82, the algorithm determines whether or not the entire machining process has been completed by comparing the current time with the time $t_{finish}$ indicative of the end of the machining process. If the machining process has been completed, step 82 proceeds to step 76 without generating an error signal. Otherwise, step 82 branches back to step 66 where the above process is iteratively repeated for each time segment 51 between the initiation of the machining process at time $t_0$ and its completion at time $t_{finish}$.

The error signal generated at step 74 may be used for any desired purpose. For example, the error signal may activate an alarm, terminate the machining operation, divert the part to a scrap conveyor, etc.

One advantage of comparing the energy consumption and slope of the energy consumption graph for each of the time segments 51 is that a bad quality part may be determined at an early point in the machining process thus enabling the machining process to be terminated early. This, in turn, saves machining time.

From the foregoing, it can be seen that the present invention provides a method and apparatus for monitoring the quality of the machined part. Furthermore, the method of the present invention may also be used to detect tool wear and/or other maintenance problems in the machining process.

Having described our invention, however, many modifications thereto will become apparent to those skilled in the art to which it pertains without deviation from the spirit of the invention as defined by the scope of the appended claims.

We claim:

1. A method for monitoring the quality of a friction stir welding operation in which a friction stir welding tool is moved by a motor to form a friction stir weld comprising the steps of
    determining the energy consumption of the motor during at least one time segment between the initiation and the completion of the stir welding operation,
    comparing the determined energy consumption with a preset threshold, and
    generating an error signal when the determined energy consumption is outside of said preset threshold.

2. The invention as defined in claim 1 wherein said determining step further comprises the steps of
    iteratively calculating the power consumption in a plurality of time increments in said at least one time segment, and
    summing the power consumption in said time segments.

3. The invention as defined in claim 2 wherein the motor is an electric motor and wherein said calculating step further comprises the steps of
    measuring a voltage of the motor during each time increment,
    measuring a current of the motor during each time increment, and
    calculating the product of the measured voltage and measured current during each time increment.

4. The invention as defined in claim 1 and further comprising the steps of
    iteratively determining the slope of the energy consumption during said at least one time segment,
    comparing the determined slope of energy consumption with a preset range of slopes, and
    generating said error signal when the determined slope of energy consumption is outside of said range.

5. The invention as defined in claim 4 wherein said preset range of slopes varies as a function of elapsed time from the initiation of the friction stir welding operation.

6. The invention as defined in claim 1 and further comprising the steps of
    comparing the determined energy consumption with a preset maximum threshold, and
    generating the error signal when the determined energy consumption is greater than said preset maximum threshold.

7. The invention as defined in claim 1 wherein said preset threshold comprises a preset minimum threshold.

8. A method for monitoring the quality of a machining operation in which a tool is moved by a motor during the machining operation comprising the steps of
    determining the energy consumption of the motor during at least one time segment between the initiation and the completion of the stir welding operation,
    comparing the determined energy consumption with a preset threshold, and
    generating an error signal when the determined energy consumption is outside of said preset threshold.

9. The invention as defined in claim 8 wherein said determining step further comprises the steps of iteratively calculating the power consumption in a plurality of time increments in said at least one time segment, and summing the power consumption in said time segments.

10. The invention as defined in claim 9 wherein the motor is an electric motor and wherein said calculating step further comprises the steps of measuring a voltage of the motor during each time increment, measuring a current of the motor during each time increment, and calculating the product of the measured voltage and measured current during each time increment.

11. The invention as defined in claim 8 and further comprising the steps of iteratively determining the slope of the energy consumption during said at least one time segment, comparing the determined slope of energy consumption with a preset range of slopes, and generating said error signal when the determined slope of energy consumption is outside of said range.

12. The invention as defined in claim 11 wherein said range of slopes varies as a function of elapsed time from the initiation of the machining operation.

13. The invention as defined in claim 8 and further comprising the steps of comparing the determined energy consumption with a preset maximum threshold, and generating the error signal when the determined energy consumption is greater than said preset maximum threshold.

14. The invention as defined in claim 8 wherein said preset threshold comprises a preset minimum threshold.

15. The invention as defined in claim 8 wherein said machining operation comprises a friction stir welding operation.

16. Apparatus for monitoring the quality of a friction stir welding operation in which a friction stir welding tool is moved by a motor to form a friction stir weld comprising means for determining the energy consumption of the motor during at least one time segment between the initiation and the completion of the stir welding operation, means for comparing the determined energy consumption with a minimum threshold, and means for generating an error signal when the determined energy consumption is outside said preset threshold.

17. The invention as defined in claim 16 wherein said determining step further comprises the steps of means iteratively calculating the power consumption in a plurality of time increments in said at least one time segment, and means for summing the power consumption in said time segments.

18. The invention as defined in claim 17 wherein the motor is an electric motor and wherein said calculating step further comprises the steps of means for measuring a voltage of the motor during each time increment, means for measuring a current of the motor during each time increment, and means for calculating the product of the measured voltage and measured current during each time increment.

19. The invention as defined in claim 16 and further comprising the steps of means for iteratively determining the slope of the energy consumption during said at least one time segment, means for comparing the determined slope of energy consumption with a preset range of slopes, and means for generating said error signal when the determined slope of energy consumption is outside of said range.

20. The invention as defined in claim 19 wherein said range of slopes varies as a function of elapsed time from the initiation of the friction stir welding operation.

21. The invention as defined in claim 16 and further comprising the steps of means for comparing the determined energy consumption with a preset maximum threshold, and means for generating the bad quality signal when the determined energy consumption is greater than said preset maximum threshold.

* * * * *